United States Patent
Ducaroir et al.

(10) Patent No.: US 6,341,142 B2
(45) Date of Patent: *Jan. 22, 2002

(54) SERIAL DATA TRANSCEIVER INCLUDING ELEMENTS WHICH FACILITATE FUNCTIONAL TESTING REQUIRING ACCESS TO ONLY THE SERIAL DATA PORTS, AND AN ASSOCIATED TEST METHOD

(75) Inventors: Francois Ducaroir, Santa Clara; Karl S. Nakamura, Palo Alto; Michael O. Jenkins, San Jose, all of CA (US)

(73) Assignee: LSI Logic Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,715

(22) Filed: Dec. 16, 1997

(51) Int. Cl.$^7$ ............................ H04L 5/16; H04B 3/46
(52) U.S. Cl. .................................. 375/219; 375/224
(58) Field of Search .............................. 375/219, 221, 375/358, 222, 224, 377, 226, 257, 371, 373; 370/366, 249; 455/67.1, 67.4, 226.1

(56) References Cited

U.S. PATENT DOCUMENTS

| | | |
|---|---|---|
| 4,048,445 A | 9/1977 | Ghisler |
| 4,308,472 A | 12/1981 | McLaughlin |
| 4,402,075 A | 8/1983 | Bargeton et al. |
| 4,419,633 A | 12/1983 | Phillips |
| 4,529,979 A | 7/1985 | Kusama et al. |
| 4,564,933 A | 1/1986 | Hirst |
| 4,573,017 A | 2/1986 | Levine |
| 4,575,841 A | 3/1986 | Fagerstedt et al. |
| 4,575,864 A | 3/1986 | Rice, Jr. et al. |
| 4,613,979 A | 9/1986 | Kent |
| 4,751,469 A | 6/1988 | Nakagawa et al. |
| 4,806,878 A | 2/1989 | Cowley |
| 4,988,901 A | 1/1991 | Kamuro et al. |
| 5,028,813 A | 7/1991 | Hauck et al. |
| 5,043,976 A | 8/1991 | Abiven et al. |
| 5,088,112 A | 2/1992 | Pyhalammi et al. |
| 5,126,690 A | 6/1992 | Bui et al. |
| 5,159,279 A | 10/1992 | Shenoi et al. |

(List continued on next page.)

*Primary Examiner*—Chi Pham
*Assistant Examiner*—Khai Tran
(74) *Attorney, Agent, or Firm*—Conley, Rose & Tayon

(57) ABSTRACT

A serial data transceiver is presented which includes elements which facilitate testing using only the serial data transfer terminals of the transceiver. The serial data transceiver includes a transmitter and a receiver. The transmitter receives parallel data, converts the parallel data to a serial data stream, and transmits the serial data stream. The receiver receives a serial data stream, converts the serial data stream to parallel data, and provides the parallel data. During testing, parallel data produced by the receiver is routed to the transmitter input. In one embodiment, the transmitter includes a first router for routing parallel input data to the transmitter, and the receiver includes a second router for routing parallel output data produced by the receiver. The first router is coupled to the second router, both routers receive a test signal. When the test signal is asserted, the second router routes the parallel output data produced by the receiver to the first router, and the first router routes the parallel output data produced by the receiver to the transmitter. As a result, the received serial data is retransmitted by the transceiver. A test method involves asserting the test signal, providing serial input test data to a serial data input port, receiving serial output test data from a serial data output port, and comparing the serial output test data to the serial input test data. A match between the serial output test data and the serial input test data verifies proper operation of the serial data transceiver.

11 Claims, 1 Drawing Sheet

U.S. PATENT DOCUMENTS

| | | | |
|---|---|---|---|
| 5,180,993 A | 1/1993 | Dent | |
| 5,200,979 A | 4/1993 | Harris | |
| 5,251,217 A | 10/1993 | Travers et al. | |
| 5,268,652 A | 12/1993 | Lafon | |
| 5,274,668 A * | 12/1993 | Marschall | 375/224 |
| 5,301,207 A | 4/1994 | Emerson et al. | |
| 5,327,103 A | 7/1994 | Baron et al. | |
| 5,343,461 A * | 8/1994 | Barton et al. | 370/249 |
| 5,379,409 A | 1/1995 | Ishikawa | |
| 5,398,270 A | 3/1995 | Cho et al. | |
| 5,550,802 A | 8/1996 | Worsley et al. | |
| 5,559,854 A | 9/1996 | Suzuki | |
| 5,638,518 A * | 6/1997 | Malladi | 709/251 |
| 5,787,114 A | 7/1998 | Ramamurthy et al. | |
| 5,790,563 A * | 8/1998 | Ramamurthy et al. | 714/736 |
| 5,956,370 A * | 9/1999 | Ducaroir et al. | 375/221 |

\* cited by examiner

SERIAL DATA TRANSCEIVER INCLUDING ELEMENTS WHICH FACILITATE FUNCTIONAL TESTING REQUIRING ACCESS TO ONLY THE SERIAL DATA PORTS, AND AN ASSOCIATED TEST METHOD

BACKGROUND OF THE INVENTION

1. Field of the Invention

This invention relates to digital data communication circuits, and more particularly to the operational verification of serial data communication circuits.

2. Description of the Relevant Art

Electronic devices typically communicate via electrical signals (e.g., voltage and/or current) driven upon electrical conductors (e.g., metal wires). Simultaneous transmission of multiple signals is accommodated by several wires routed in parallel (i.e., buses). Most computer systems have a modular architecture centered around a bus which serves as a shared communication link between system components. The two major advantages of shared buses over direct communication links between system components are versatility and low cost. By defining a standard interconnection scheme for a given bus, new devices may be easily connected to the bus. The cost of the bus is low because it is shared among the number of components connected to the bus.

Due to technological advances, the signal processing capabilities of more modern electronic devices (e.g., microprocessors) are outstripping the signal transfer capabilities of conventional parallel buses. To their detriment, parallel buses have physical limitations which place an upper limit on the rate at which information can be transferred over the bus. For example, the electrical characteristics and loading of each wire of a bus may vary, causing signals transmitted simultaneously upon the bus to be received at different times. Bus timing must take into consideration worst case delays, resulting in reduced data transfer rates of systems employing parallel buses.

A serial data path, on the other hand, is a direct communication link between a single transmitter and a single receiver. Such a serial data path typically includes a dedicated transmission medium connected between the transmitter and receiver. The transmission medium may be, for example, a differentially-driven pair of wires or a fiber-optic cable. In cases where the transmission medium is a pair of wires, the communication link (i.e., channel) has a defined electrical loading and is typically optimized for minimum signal delay. As a result, the rate at which electrical signals can be transferred over such a serial data path exceeds the data transfer rate of a common shared parallel bus.

Serial data transmitter/receiver devices (i.e., transceivers) offering digital signal transmission rates exceeding 1 gigabit per second are now commercially available. The testing of such transceivers at their normal operating speeds, however, presents many technical challenges. Consider a serial data transceiver including a transmitter and a receiver. The transmitter receives parallel data at an input port, converts the parallel data to a serial data stream, and provides the serial data stream at an output port. The receiver receives a serial data stream at an input port, converts the serial data stream to parallel data, and provides the parallel data at an output port. A conventional method of operationally testing such a transceiver is to connect the transmitter output port to the receiver input port in a "loopback" fashion, provide parallel input test data to the transmitter input port, receive parallel output test data from the output port of the receiver, and compare the parallel output test data to the parallel input test data. A match between the parallel output test data and the parallel input test data verifies proper operation of the transceiver.

When the transceiver is installed within, for example, a computer system, access to the parallel data transfer terminals (i.e., the transmitter input port and the receiver output port) is typically limited to other computer system components coupled to the transceiver data transfer terminals. In order to gain access to the parallel data transfer terminals for testing, it may be necessary to disassemble the system to access the transceiver, to remove the transceiver from the system, and to mount the transceiver within a special test fixture which connects the transmitter output port to the receiver input port. Following testing, the transceiver must be reinstalled within the system and the system reassembled.

In contrast, the serial data transfer terminals of the transceiver (i.e., the receiver input port and the transmitter output port) are by design easily accessible and available for testing without system disassembly. In addition, serial data testing requires fewer wires and physical connections than parallel data testing. Testing problems are often the result of faulty wires and physical connections.

It would be beneficial to have a serial data transceiver which includes elements which facilitate functional testing requiring access to only the serial data transfer terminals of the transceiver (i.e., only the receiver input port and the transmitter output port). Such a serial data transceiver and accompanying test method would eliminate the need to disassemble a computer system including the transceiver in order to test the transceiver. In addition, the fewer wires and physical connections involved in serial testing of the transceiver would reduce problems associated with faulty wires and physical connections. In addition to transceiver testing and characterization, such testing capability is also beneficial for system debugging. For example, assume several computers are connected to a shared communication medium forming a computer network having a loop topology. Each transceiver operating in "loopback" mode immediately retransmits incoming serial data, behaving like a wire. Such action allows testing of the network independent of the transceivers.

SUMMARY OF THE INVENTION

A serial data transceiver is presented having elements which facilitate functional testing using only the serial data transfer terminals of the transceiver. An associated test apparatus and method employs these elements. The present transceiver architecture solves a test access problem. Testing of the serial data transceiver mounted within a computer system does not require disassembly of the computer system and removal of the transceiver from the system. The serial data transfer terminals are typically easily accessible and available for testing. In addition, fewer wires and physical connections are required for serial data testing than for parallel data testing. The use of fewer wires and physical connections reduces problems associated with faulty wires and physical connections.

The serial data transceiver includes a transmitter and a receiver formed upon a monolithic semiconductor substrate. The transmitter receives parallel data, converts the parallel data to a serial data stream, and transmits the serial data stream. The receiver receives a serial data stream, converts the serial data stream to parallel data, and provides the parallel data. The transmitter and receiver are also coupled to receive a test signal. When the test signal is asserted, parallel data is routed from the output of the receiver to the input of the transmitter. Functional testing of the serial data transceiver may thus be accomplished with access to only the serial data ports of the transceiver.

In order to facilitate the routing the output of the receiver to the input of the transmitter, one embodiment of the serial data transceiver includes two routers. A first router within the transmitter routes parallel input data to the transmitter. A second router within the receiver routes parallel output data and the recovered clock signal produced by the receiver. The first router is coupled to the second router, and both routers are configured to receive a 'test' signal. When the test signal is asserted, the second router routes the parallel output data produced by the receiver to the first router, and the first router routes the parallel output data produced by the receiver to the transmitter. As a result, the received serial data is retransmitted by the transceiver during testing.

In one embodiment, the transceiver includes a 'transmit data' input port for receiving parallel input data to be transmitted, a serial data output port, a serial data input port, a 'receive data' output port for providing parallel output data produced by the receiver, and a recovered clock terminal. The transmitter is coupled between the transmit data input port and the serial data output port. The transmitter receives the parallel input data, converts the parallel input data to a serial data stream, and transmits the serial data stream at the serial data output port. The transmitter includes a serializer for converting the parallel input data to the serial data stream. The first router is coupled between the transmit data input port and the serializer, and routes parallel input data and a recovered clock signal to the serializer dependent upon the test signal. The receiver is coupled between the serial data input port and the receive data output port. The receiver receives a serial data stream from the serial data input port, converts the serial data stream to parallel output data, and provides the parallel output data.

The receiver includes a deserializer for converting the serial data stream into the parallel output data. The deserializer also recovers a clock signal (i.e., the recovered clock signal) from the serial data stream. The second router is coupled between the deserializer and the receive data output port. The second router provides the recovered clock signal to the recovered clock terminal. The second router also routes the parallel output data produced by the deserializer dependent upon the test signal. When the test signal is deasserted: (i) the first router routes parallel input data from the transmit data input port to the serializer, and (ii) the second router routes parallel output data from the deserializer to the receive data output port. The serializer uses the reference clock signal to serialize the parallel input data. When the test signal is asserted: (i) the second router routes parallel output data and the recovered clock signal produced by the deserializer to the first router, and (ii) the first router routes the parallel output data and the recovered clock signal received from the second router to the serializer. The serializer uses the recovered clock signal to serialize the parallel output data produced by the deserializer.

The present method for testing the serial data transceiver described above includes asserting the test signal, providing serial input test data to the serial data input port, receiving serial output test data from the serial data output port, and comparing the serial output test data to the serial input test data. A test unit including a serial test generator and a serial data comparator may be coupled to the transceiver during testing and used to generate the serial input test data and to perform the comparison operation. A match between the serial output test data and the serial input test data (i.e., a one-to-one correspondence between the logic values of the corresponding bit positions of the serial output test data and the serial input test data) verifies proper operation of the serial data transceiver.

BRIEF DESCRIPTION OF THE DRAWINGS

Other objects and advantages of the invention will become apparent upon reading the following detailed description and upon reference to the accompanying drawings in which.

Figure 1:
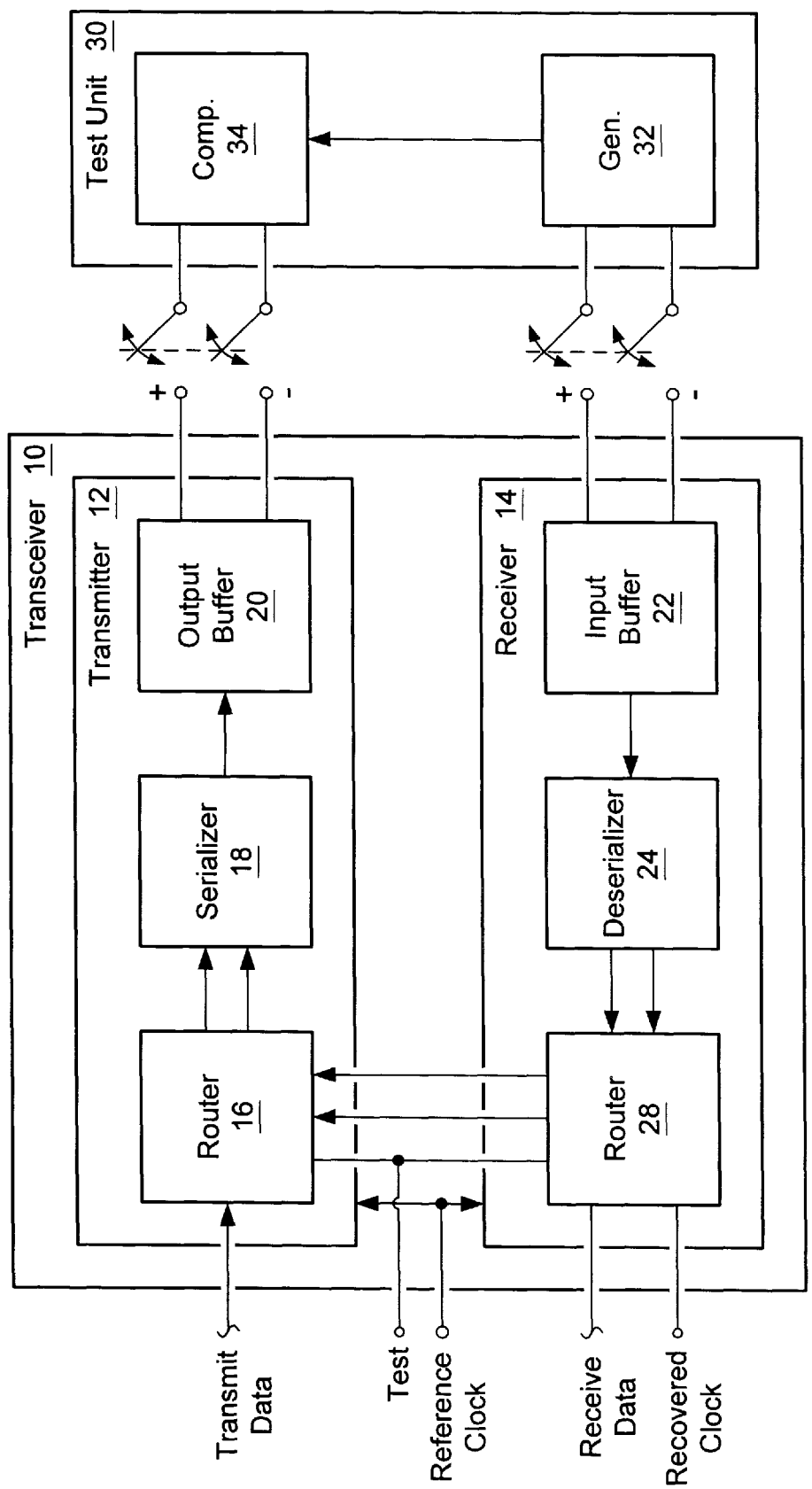
FIG. 1 is a block diagram of one embodiment of a serial data transceiver of the present invention and a related test unit, wherein the serial data transceiver includes a transmitter for transmitting serial data, a receiver for receiving serial data, and a mechanism for routing the output of the receiver to the input of the transmitter during testing such that received serial data is retransmitted by the transmitter.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Referring now to the drawings, FIG. 1 is a block diagram of one embodiment of a serial data transceiver 10 of the present invention. Transceiver 10 includes a transmitter 12 and a receiver 14 formed upon a single monolithic semiconductor substrate. Transceiver 10 also includes a transmit data input port, a pair of polarized transmitter output terminals, a pair of polarized receiver input terminals, a receive data output port, a 'reference clock' terminal, a test terminal, and a 'recovered clock' terminal. During normal operation, transmitter 12 receives parallel data from the transmit data input port, converts the parallel data to a serial data stream (i.e., serializes the parallel data), and transmits the serial data stream differentially between the pair of polarized transmitter output terminals. The operations of transmitter 12 are synchronized by a 'reference clock' signal coupled to the 'reference clock' terminal. During normal operation, receiver 14 receives a serial data stream from between the pair of polarized receiver input terminals, converts the serial data stream to parallel data (i.e., deserializes the serial data stream), and provides the parallel data at the receive data output port. The operations of receiver 14 are synchronized by a clock signal recovered from the serial data stream (i.e., a 'recovered clock' signal).

Transmitter 12 includes a router 16, a serializer 18, and an output buffer 20. Router 16 receives parallel data from the transmit data input port, parallel data produced by receiver 14, and a test signal coupled to the test terminal. Router 16 provides either the parallel data from the transmit data input port or the parallel data produced by receiver 14 to serializer 18 dependent upon the test signal. When the test signal is deasserted, router 16 provides the parallel data from the transmit data input port to serializer 18. Serializer 18 uses the reference clock signal to serialize the parallel data provided by router 16 and provides the resulting serial data stream to output buffer 20. Output buffer 20 differentially drives the pair of polarized transmitter output terminals with complementary voltage values representing the logic values of the serial data stream. When the test signal is asserted, router 16 provides the parallel data and the recovered clock signal produced by receiver 14 to serializer 18. Serializer 18 uses the recovered clock signal to serialize the parallel data provided by router 16 and provides the resulting serial data stream to output buffer 20.

Receiver 14 includes an input buffer 22, a deserializer 24, and a router 28. Input buffer 22 receives a differentially-driven serial data stream from between the pair of polarized receiver input terminals and provides the corresponding logic values of the serial data stream to deserializer 24. Deserializer 24 recovers a transmit clock signal used to transmit the serial data from the serial data stream (i.e., the recovered clock signal), samples the serial data stream using the transmit clock signal stream in order to recover the data from the serial data stream, aligns the deserialized data into parallel units, and provides the resulting parallel data and recovered clock signal to router 28. Router 28 receives the parallel data and recovered clock signal from deserializer 24 as well as the test signal. Router 28 provides the recovered clock signal to the recovered clock terminal. Router 28 also provides parallel data to either the receive data output port or to router 16 of transmitter 12 dependent upon the test signal. When the test signal is deasserted, router 28 provides the parallel data to the receive data output port. When the test signal is asserted, router 28 provides both the parallel data and the recovered clock signal to router 16 of transmitter 12.

Router 16 and router 28 may include, for example, arrays of switches operating in parallel. During normal operation, the test signal is deasserted, router 16 provides parallel data from the transmit data input port to serializer 18, and router 28 provides parallel data from deserializer 24 to the receive data output port. During testing, transmitter 12 uses the recovered clock signal produced by receiver 14 to serialize the parallel output data produced by receiver 14. Thus during testing, the operations of transmitter 12 and receiver 14 are synchronized by the recovered clock signal.

FIG. 1 also shows a test unit 30 coupled to transceiver 10 during testing to verify proper operation of transceiver 10. Test unit 30 includes a serial data generator 32 and a serial data comparator 34. During testing, the test signal is asserted. Serial data generator 32 generates a serial test data stream and differentially drives the polarized pair of receiver input terminals of transceiver 10 with complementary voltage values representing the logic values of the serial test data stream. Input buffer 22 of receiver 14 receives the voltage values and provides the corresponding logic values to deserializer 24. Deserializer 24 produces the recovered clock signal, uses the recovered clock signal to deserialize the serial test data stream, and provides both the recovered clock signal and the resulting parallel test data to router 28. Router 28 receives the recovered clock signal and the parallel test data from deserializer 24, provides the recovered clock signal to the recovered clock terminal, and also provides the recovered clock signal and the parallel test data to router 16 of transmitter 12. Router 16 provides the recovered clock signal and the parallel test data to serializer 18. Serializer 18 uses the recovered clock signal to serialize the parallel test data provided by router 16, and provides the resulting serial test data stream to output buffer 20. Output buffer 20 differentially drives the pair of polarized transmitter output terminals with complementary voltage values representing the logic values of the serial test data stream. Serial data comparator 34 receives the voltage values produced by transmitter 12 and converts the voltage values to the corresponding serial output test data. Serial data comparator 34 then compares the serial output test data to the serial input test data provided by serial data generator 32. A match between the serial output test data and the serial input test data (i.e., a one-to-one correspondence between the logic values of the corresponding bit positions of the serial output test data and the serial input test data) verifies proper operation of transceiver 10.

It will be appreciated by those skilled in the art having the benefit of this disclosure that this invention is believed to be a serial data transceiver including elements which facilitate functional testing requiring access to only the serial data ports, and an associated test apparatus and method. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A serial data transceiver formed upon a monolithic semiconductor substrate, comprising:

a receiver adapted to operably receive a first serial data stream, to convert the first serial data stream into parallel data, and to produce the parallel data; and a transmitter coupled to receive the parallel data produced by the receiver during a time in which a test signal is asserted into the transceiver, whereupon the transmitter converts the parallel data produced by the receiver into a second serial data stream.

2. The serial data transceiver as recited in claim 1, further comprising:

a serial data input port;

a serial data output port;

wherein the receiver is coupled to the serial data input port and receives the first serial data stream via the serial data input port; and wherein the transmitter is coupled to the serial data output port and provides the second serial data stream to the serial data output port.

3. The serial data transceiver as recited in claim 1, wherein the transmitter comprises a first router for routing parallel input data to the transmitter.

4. The serial data transceiver as recited in claim 3, wherein the receiver comprises a second router for routing parallel output data produced by the receiver.

5. The serial data transceiver as recited in claim 4, wherein the first router is coupled to the second router, and wherein the first and second routers are coupled to receive the test signal, and wherein when the test signal is asserted: (i) the second router routes the parallel output data produced by the receiver to the first router, and (ii) the first router routes the parallel output data produced by the receiver to the transmitter.

6. A system for testing a transceiver, comprising:

a test unit;

a serial data input port adapted to receive a serialized input test signal from the test unit;

a serial data output port adapted to present a serialized output test signal to the test unit;

a mechanism embodied within the transceiver for converting and routing, in parallel fashion, the serialized input test signal to the serialized output test signal; and a comparator within the test unit for comparing the serialized input test signal to the serialized output test signal to determine the accuracy by which the mechanism converts the serialized input test signal to the serialized output test signal.

7. The system as recited in claim 6, wherein said mechanism comprises at least one router operably coupled between the serial data input port and the serial data output port.

8. The system as recited in claim 7, wherein the router couples parallel signals converted from respective said serialized input test signal and said serialized output test signal.

9. The system as recited in claim 6, wherein said mechanism comprises a serializer and a deserializer coupled in series between the serial data input port and the serial data output port.

10. A serial data transceiver formed upon a monolithic semiconductor substrate, comprising:
   a transmit data input port for receiving parallel input data;
   a serial data output port;
   a serial data input port;
   a receive data output port for providing parallel output data;
   a transmitter coupled between the transmit data input port and the serial data output port, wherein the transmitter is configured to receive parallel input data, to convert the parallel input data to a serial data stream, and to transmit the serial data stream at the serial data output port, wherein the transmitter comprises:
      a serializer for converting the parallel input data to the serial data stream; and
      a first router coupled between the transmit data input port and the serializer for routing parallel input data to the serializer;
   a receiver coupled between the serial data input port and the receive data output port, wherein the receiver is configured to receive a serial data stream from the serial data input port, to convert the serial data stream to parallel output data, and to provide the parallel output data, wherein the receiver comprises:
      a deserializer for converting the serial data stream to the parallel output data; and
      a second router coupled between the deserializer and the receive data output port for routing the parallel output data produced by the deserializer;
   wherein the first router is coupled to the second router, and wherein the first and second routers are coupled to receive a test signal, and wherein when the test signal is deasserted:
      the first router routes parallel input data from the transmit data input port to the serializer; and
      the second router routes parallel output data from the deserializer to the receive data output port;
   and wherein when the test signal is asserted:
      the second router routes parallel output data from the deserializer to the first router; and
      the first router routes the parallel output data from the second router to the serializer.

11. A method for testing a serial data transceiver, comprising:
   providing a serial data transceiver, comprising:
      a serial data output port;
      a serial data input port;
      a transmitter coupled to the serial data output port, wherein the transmitter is configured to receive parallel data, to convert the parallel data to a serial data stream, and to transmit the serial data stream at the serial data output port, wherein the transmitter comprises a first router for routing parallel data to the transmitter;
      a receiver coupled to the serial data input port, wherein the receiver is configured to receive a serial data stream, to convert the serial data stream to parallel data, and to provide the parallel data, wherein the receiver comprises a second router for routing the parallel data produced by the receiver;
      wherein the first router is coupled to the second router, and wherein the first and second routers are coupled to receive a test signal, and wherein when the test signal is asserted: (i) the second router routes parallel data produced by the receiver to the first router; and (ii) the first router routes the parallel data produced by the receiver to the transmitter;
   asserting the test signal;
   providing serial input test data to the serial data input port;
   receiving serial output test data from the serial data output port; and
   comparing the serial output test data to the serial input test data.

* * * * *